(12) United States Patent
Ahr et al.

(10) Patent No.: US 10,261,911 B2
(45) Date of Patent: Apr. 16, 2019

(54) APPARATUS AND METHOD FOR COMPUTATIONAL WORKFLOW MANAGEMENT

(71) Applicant: The Johns Hopkins University, Baltimore, MD (US)

(72) Inventors: Brian E. Ahr, Ellicott City, MD (US); Jonathan Z. Gehman, Silver Spring, MD (US); Khadir A. Griffith, Towson, MD (US); Gary L. Jackson, II, Laurel, MD (US); William J. La Cholter, Washington, DC (US); Anthony J. Castellani, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 155 days.

(21) Appl. No.: 15/642,364

(22) Filed: Jul. 6, 2017

(65) Prior Publication Data

US 2018/0067865 A1 Mar. 8, 2018

Related U.S. Application Data

(60) Provisional application No. 62/384,735, filed on Sep. 8, 2016.

(51) Int. Cl.
*G06F 9/46* (2006.01)
*G06F 12/0891* (2016.01)
(Continued)

(52) U.S. Cl.
CPC ........ *G06F 12/0891* (2013.01); *G06F 9/5016* (2013.01); *G06F 9/5066* (2013.01);
(Continued)

(58) Field of Classification Search
CPC ............ G06F 12/0891; G06F 12/0842; G06F 12/121; G06F 9/5066; G06F 9/5016;
(Continued)

(56) References Cited

U.S. PATENT DOCUMENTS

| 5,819,102 A * | 10/1998 | Reed ..................... G06F 9/3877 712/34 |
| 6,212,605 B1 * | 4/2001 | Arimilli ................ G06F 12/126 711/118 |

(Continued)

OTHER PUBLICATIONS

Michael O. Rabin, "Fingerprinting by Random Polynomials," Technical Report TR-15-81, Center for Research in Computing Technology, Harvard University, 1981, pp. 1-12.
(Continued)

*Primary Examiner* — Adam Lee
(74) *Attorney, Agent, or Firm* — Noah J. Hayward

(57) ABSTRACT

Apparatuses and methods for performing computational workflow management are provided. An example apparatus may include processing circuitry. The processing circuitry may be configured to receive a computation resource reservation request for cache from a client to perform a computation, and decompose the computation into a workflow of tasks, generate a task label for each task result and the associated task, and compare a selected task label with previous task labels to determine if the selected task label matches one of the previous task labels. The processing circuitry may be further configured to, in response to determining that the selected task label matches one of the previous task labels, perform the computation using a task result that is associated with the matched one of the previous task labels that is currently stored in the cache for the task result of the selected task label.

18 Claims, 4 Drawing Sheets

(51) Int. Cl.
*G06F 9/50* (2006.01)
*G06F 12/0842* (2016.01)
*G06F 12/121* (2016.01)

(52) U.S. Cl.
CPC ........ *G06F 12/0842* (2013.01); *G06F 12/121*
(2013.01); *G06F 2209/5014* (2013.01); *G06F
2209/5017* (2013.01); *G06F 2212/1041*
(2013.01); *G06F 2212/1052* (2013.01); *G06F
2212/60* (2013.01)

(58) Field of Classification Search
CPC ..... G06F 2212/1052; G06F 2212/1041; G06F
2209/5014; G06F 2209/5017; G06F
2212/60
See application file for complete search history.

(56) References Cited

U.S. PATENT DOCUMENTS

| | | | | |
|---|---|---|---|---|
| 6,629,234 | B1* | 9/2003 | Col | G06F 9/34 711/118 |
| 6,690,380 | B1* | 2/2004 | Hussain | G06F 12/0875 345/557 |
| 6,757,708 | B1* | 6/2004 | Craig | G06F 16/9574 709/203 |
| 6,973,457 | B1* | 12/2005 | Bastawala | G06F 16/24552 707/770 |
| 7,219,347 | B1* | 5/2007 | Waddington | G06F 9/4881 718/102 |
| 8,407,206 | B2* | 3/2013 | Proebsting | G06F 8/20 707/637 |
| 8,806,138 | B1* | 8/2014 | Colby | G06F 12/0808 711/133 |
| 9,037,798 | B2* | 5/2015 | Lysko | G06F 1/0353 708/200 |
| 2002/0108029 | A1* | 8/2002 | Kondoh | G06F 9/322 712/234 |
| 2002/0120814 | A1* | 8/2002 | Lee | G06F 7/57 711/118 |
| 2003/0200194 | A1* | 10/2003 | Arnold | G06F 16/24552 |
| 2003/0236781 | A1* | 12/2003 | Lei | G06F 21/6227 |
| 2003/0236848 | A1* | 12/2003 | Neiman | G06F 9/505 709/213 |
| 2005/0154838 | A1* | 7/2005 | DeWitt, Jr. | G06F 9/30181 711/144 |
| 2006/0259896 | A1* | 11/2006 | Hanson | G06F 8/20 717/118 |
| 2007/0006120 | A1* | 1/2007 | Proebsting | G06F 8/20 717/101 |
| 2007/0220026 | A1* | 9/2007 | Isard | G06F 12/0802 |
| 2008/0181524 | A1* | 7/2008 | Nonaka | G06F 16/583 382/254 |
| 2009/0013128 | A1* | 1/2009 | Peterson | G06F 9/443 711/113 |
| 2010/0017436 | A1* | 1/2010 | Wolge | G06F 16/24539 707/E17.055 |
| 2011/0055202 | A1* | 3/2011 | Heimendinger | G06F 16/245 707/721 |
| 2011/0302371 | A1* | 12/2011 | Lysko | G06F 1/0353 711/118 |
| 2012/0005668 | A1* | 1/2012 | Serizawa | G06F 12/0866 718/1 |
| 2013/0086327 | A1* | 4/2013 | Coulson | G06F 8/4442 711/125 |
| 2014/0258605 | A1* | 9/2014 | Cai | G06F 12/12 711/105 |
| 2014/0359632 | A1* | 12/2014 | Kishan | G06F 9/5038 718/103 |
| 2015/0121013 | A1* | 4/2015 | Chiang | G06F 12/0808 711/133 |
| 2015/0347410 | A1* | 12/2015 | Kim | G06F 16/2445 707/769 |
| 2016/0219123 | A1* | 7/2016 | Slavicek | H04L 67/2852 |
| 2017/0132293 | A1* | 5/2017 | Bourbonnais | G06F 16/2471 |

OTHER PUBLICATIONS

Unnamed Internet Author(s), "Open-source Workflow Manager," available online at https://azkaban.github.io/ (last accessed Jul. 19, 2017), Feb. 19, 2014, pp. 1-3.

* cited by examiner

APPARATUS AND METHOD FOR COMPUTATIONAL WORKFLOW MANAGEMENT

CROSS-REFERENCE TO RELATED APPLICATION

This application claims the benefit of and priority to prior-filed, U.S. Provisional Application Ser. No. 62/384,735 filed on Sep. 8, 2016, the entire contents of which are hereby incorporated herein by reference.

STATEMENT OF GOVERNMENTAL INTEREST

This invention was made with Government support under contract number N00024-13-D-6400 awarded by the Naval Sea Systems Command (NAVSEA). The Government has certain rights in the invention.

TECHNICAL FIELD

Example embodiments generally relate to computer resource management and, more particularly, relate to computational workflow management and caching.

BACKGROUND

High power computer systems offer the ability to conduct sophisticated and complex computations for any number of applications. Many computational processes, such as science and engineering computational processes, can require significant amounts of time to complete and consume significant amounts of storage space during execution of the computation. Typically, efforts to reduce the time needed to complete such computations involve adding more processing power and more memory.

BRIEF SUMMARY OF SOME EXAMPLES

One example apparatus configured to perform computational workflow management may comprise processing circuitry. The processing circuitry may be configured to receive a computation resource reservation request for cache from a client to perform a computation, and decompose the computation into a workflow of tasks. Each task may have a task result and at least some tasks may be dependent upon the task results of other tasks. The processing circuitry may be further configured to generate a task label for each task result and the associated task. In this regard, each task label may be a functional description of the associated task and the tasks that are dependent to the associated task. The processing circuitry may be further configured to compare a selected task label with previous task labels to determine if the selected task label matches one of the previous task labels. The selected task label may be one of the generated task labels, and the previous task labels may be associated with task results for previously executed tasks that are currently stored in a cache. The processing circuitry may be further configured to, in response to determining that the selected task label matches one of the previous task labels, perform the computation using a task result that is associated with the matched one of the previous task labels that is currently stored in the cache for the task result of the selected task label.

Another apparatus configured to perform computational workflow management may comprise processing circuitry. The processing circuitry may be configured to receive a computation resource reservation request for cache from a client to perform a computation, and decompose the computation into a workflow of tasks, wherein each task has a task result. In this regard, at least some tasks are dependent upon the task results of other tasks. The processing circuitry may be further configured to generate a task label for each task and associated task result. Each task label may be a functional description of the associated task and the tasks that are dependent to the associated task. The processing circuitry may be further configured to compare the generated task labels with previous task labels to identify previous task labels that do not match with a generated task label. The previous task labels may be associated with task results for previously executed tasks that are currently stored in a cache. The processing circuitry may be further configured to evict portions of the cache associated with the previous task labels that do not match a generated task label and are not reserved by other workflows.

An example method for performing computational workflow management is also provided. The example method may comprise receiving a computation resource reservation request for cache from a client to perform a computation, decomposing, by processing circuitry, the computation into a workflow of tasks, wherein each task has a task result and wherein at least some tasks are dependent upon the task results of other tasks. The example method may further comprise generating a task label for each task and associated task result, wherein each task label is a functional description of the associated task and the tasks that are dependent to the associated task. The example method may further comprise comparing a selected task label with previous task labels to determine if the selected task label matches one of the previous task labels, wherein the selected label is one of the generated labels, and wherein the previous task labels are associated with task results for previously executed tasks that are currently stored in a cache. Additionally, the example method may comprise, in response to determining that the selected task label matches one of the previous task labels, performing the computation using a task result that is associated with the matched one of the previous task labels that is currently stored in the cache for the task result of the selected task label.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
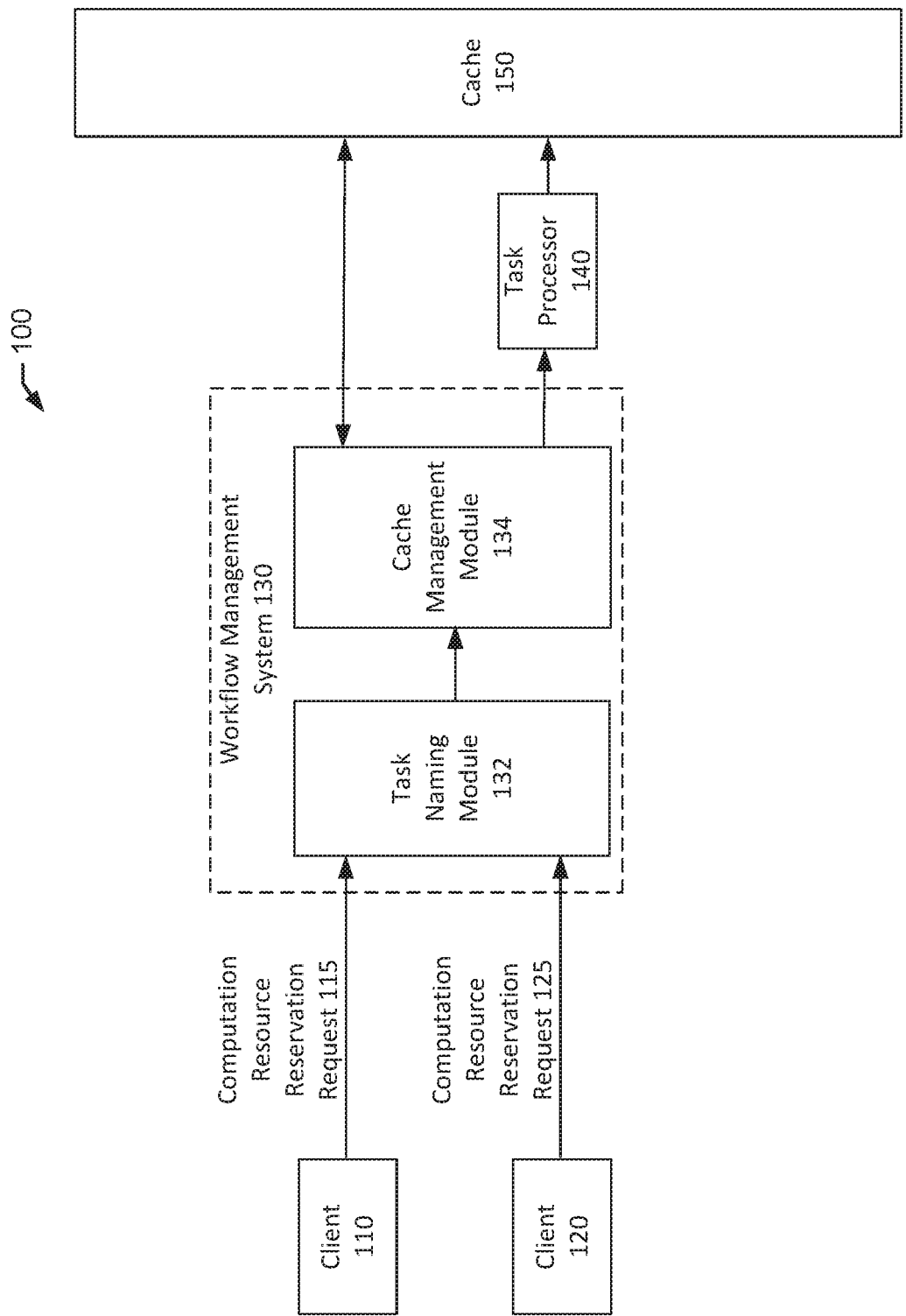
FIG. 1 shows an example system for performing computational workflow management according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

According to some example embodiments, systems, methods, and apparatuses are described herein that facilitate the performance of computational workflow management. In this regard, computational workflow management may be used to improve management of computing resources, such as, memory, by identifying redundancies and evicting data form memory that is no longer needed for the computation.

To reduce resource utilization and avoid processing redundancies, some example embodiments decompose a computation into a workflow that comprises of a number of tasks. Each task may have a task result (or intermediate result) that can be stored in memory or cache with a task label that functionally describes the task. Using the labels, redundant tasks can be identified and associated task results can be reused (rather than reprocessing the same task). Further, the labels can be used to identify task results that are stored in memory, but are no longer needed. The associated portion of cache allocated to the task result can therefore be evicted for use by, for example, other workflows.

The use of workflow decompositions and task labels as described herein, according to some example embodiments, can be leveraged to guarantee a liveness property for the workflow process that ensures that the process will be completed without being permanently interrupted. In this regard, according to some example embodiments, processes may not be arbitrarily deferred thereby providing the desired level of liveness.

Further, a safety guarantee may also be considered in some example embodiments, because storage capacity is presumably not infinite. In this regard, eventually, old cached items may have to be evicted to create space for new items. The eviction procedure must be scrutinizing and robust so as not to cause errors with computations that are already in progress by evicting data prematurely. As such, a safe eviction procedure may involve, according to some example embodiments, only evicting cached items that are determined to be unneeded.

With reference to FIG. 1, a framework in the form of a system is shown within which computational workflow management may be performed. In this regard, clients 110, 120 may require a computation to be performed. Accordingly, each client 110, 120 may require that a computation be performed on the client's behalf. To effectuate this computation, the clients 110, 120 may make a request for resources in the form of a computation resource reservation request 115, 125. Based on various criteria (e.g., available cache), the workflow management system 130, which may be implemented on a computer, may select a computation request to service next. If the workflow management system 130 determines that the next computation request to be processed is associated with client 110, for example, then the computation request may be forwarded from the client 110 to the workflow management system 130 and the task naming module 132.

At the task naming module 132 of the workflow management system 130, the received computation request may be decomposed into a workflow of tasks. Each task may be defined to have a task result and at least some tasks may be dependent upon the task results of other tasks. The task naming module 132 may also generate a task label for each task and associated task result. Each task label may be a functional description of the associated task and the tasks that are dependent to the associated task.

The task labels may be leveraged to reduce the resource impact caused by execution of the computation. To do so, the cache management module 134 may compare a task label to identify redundant tasks and task results that are already stored in cache 150. Efficiencies can be realized by avoiding repeated execution of the redundant tasks and tasks where the solution is already available in cache 150. Additionally, because task results are stored in the cache 150 in association with a label, a comparison of labels may be used to identify already processed task results that can be reused. Further, based on the comparison, task results that are no longer useful in processing of the workflow may be identified and the associated portions of cache 150 may be released for use in further processes. The task results in the cache 150 may be associated with tasks processed as part of the same computation or from a previously processed computation. The task processor 140 may be configured to process those tasks that must be executed because the task results are not already in the cache 150. In this regard, the task may be processed by the task processor 140 and the task result may be stored in the cache 150 in association with the task label, to facilitate future comparisons. When all tasks for a given workflow have been completed (either through execution or reuse), a solution to the computation may be obtained and supplied back to the appropriate client 110, 120.

In view of the foregoing, according to some example embodiments described herein, a solution is provided to cache intermediate task results that are produced as part of a computational workflow execution, label the intermediate task results, and leverage the labels to avoid executing redundant tasks and to evict portions of cache that are storing task results that no longer needed for the workflow. Given this context, the following provides additional detail with respect to example embodiments for computational workflow management.

In this regard, a workflow may be a constructed of tasks that are linked in a manner where at least some tasks are dependent upon the results of other tasks. According to some example embodiments, the workflow may be constructed as a directed acyclic graph where each vertex of the graph represents a task to be computed and each edge of the graph represents a dependency. For example, an edge from vertex u to vertex v may indicate that the task represented at v is dependent on the output from vertex u.

To construct the workflow, the computation to be performed may be decomposed. Decomposition may be performed by separating the computation into fundamental sub-operations that may not be further decomposed. In this regard, with respect to a simple example, if the computation was (a+b)+(c+d), then the computation may be decomposed into three tasks, namely, A=(a+b), B=(c+d), and C=(result(a+b))+result(c+d)), where C is dependent upon A and B. Decomposition in this manner, may, among other things, maximize concurrency within a process since the workflow may precisely describe dependencies between tasks. In this regard, if there is no path from one task to another through the workflow graph, then those two tasks can be considered independent and the tasks may be executed in parallel. Managing and invoking every task in a workflow expends both processing and memory resources. As such, having task granularity created via decomposition, the overhead for a given computation may be better appreciated. Typically, the time to execute an individual task should dominate the overhead consideration.

Having constructed the workflow of tasks and dependencies, the structure of the workflow may be analyzed to determine if the results of individual tasks would be or are already in the cache during execution of the workflow. To make this determination, task labels may be generated and used. According to some example embodiments, each task in the workflow may be assigned a fixed length identifier, making cache indexing tractable. By leveraging the task labels, as further described below, according to some example embodiments, the solution may preserve safety and liveness as mentioned above.

As mentioned earlier, a workflow may be structured as a finite directed acyclic graph G=(V, E) such that every vertex of the graph is assigned to a task and edges within the graph define the dependencies. The labels for the workflow tasks can be defined in a manner that causes the label to be unique to the operations performed by the task to permit redundant tasks to be identified because the two tasks have the same label. To assign a label to a task, for example, the following example techniques may be utilized.

In this regard, a set V* may be defined that includes all possible workflow vertices or tasks, for any workflow (V, E), V⊂V*. A task may be some function $f: X0 \times X1 \times \ldots \times Xn \rightarrow Y$. A nullary function $f: \emptyset \rightarrow Y$ may be a special case task that produces a constant value. The set F may be the set of all tasks. A task function task: V*→F may include the information to map vertices of the graph to tasks. An evaluation function eval: V*→Y may be defined recursively, given that task(v)=$f$:

$$eval(v) = \begin{cases} f() & f \text{ is nullary} \\ f(eval(v_1), eval(v_2), \ldots, eval(v_n)) & f \text{ is } n\text{-ary} \end{cases}$$

According to some example embodiments, the evaluation function may be well defined because all workflows are finite and acyclic. An assumption can be made that a known total order for parameter application can be determined. In this regard, for example, if ord($v_1$)<ord($v_2$), then eval($v_1$) is applied to $f$ before eval($v_2$).

As such, suppose task(v)=$f$, for some vertex v. Vertex v may have i incoming edges from vertices $v_0, v_1, \ldots, v_n$. Each of those vertices may have corresponding output values, being $y_0, y_1, \ldots, y_n$. Those values may then be used as input to $f$. Thus, the output of vertex v may then be evaluated with $y=f(y_0, y_1, \ldots, y_n)$. The function may be deterministic, that is, for any fixed set of inputs $x_0, x_1, \ldots, x_n$, then $y=f(x_0, x_1, \ldots, x_n)$ may always have the same value. It can be assumed that the two functions can be differentiated without evaluating the functions. For example, it can be determined that a task that merges inputs may be different than a task that filters inputs, without the need to evaluate them.

As such, a theorem may be used with respect to the label function. In this regard, the label function lbl: V*→□$_{2k}$ may be defined where V* is the set of all possible workflow vertices. Accordingly, lbl(u)=lbl(v) ⇒ P (eval(u)=eval(v))≥k/$2^{k-1}$. The label function may be defined lbl: V*→L as follows, where V* is the set of all possible workflow vertices, and L is the set of all labels. Further, there can be some graph G=(V, E) such that V⊂V*, v∈V and, task(v) is its task function. Further, vertices $v_1, v_2, \ldots, v_n$ may be all vertices such that $v_i \in V$ and ($v_i$, v)∈E. As such, the label function may be:

$$lbl(v) = \begin{cases} (task(v)) & task(v) \text{ is nullary} \\ (task(v), lbl(v_1), lbl(v_2), \ldots, lbl(v_n)) & task(v) \text{ is } n\text{-ary} \end{cases}$$

Based on this definition of the label function for naming tasks, the following example may be considered. In this regard, for example, consider a workflow graph G=({A, B, C, D, E}, {(A, C), (B, C), (C, E), (D, E)}, where task(A)=$f_A$, task(B)=$f_B$, and task(D)=$f_D$, so lbl(A)=($f_A$), lbl(B)=($f_B$), and lbl(D)=($f_D$), respectively. Further, task(C)= $f_C$, so lbl(C)=($f_C$, ($f_A$), ($f_B$)), and task(E)=$f_E$, so lbl(E)=($f_E$, ($f_C$, ($f_A$), ($f_B$)), ($f_D$)). The label function lbl(v) may encode the transitive closure of all dependencies of v along with how the dependencies are applied. Note that eval(v) does not need to be evaluated to construct the label. As such, if there are two graphs Gu=(Vu, Eu) and Gv=(Vv, Ev) and there are vertices u∈Vu and v∈Vv such that lbl(u)=lbl(v), then eval(u)=eval(v). If u=v, then this is trivially true, and proof for the case where u does not equal v is by structural induction over the workflow graph.

As a basis, suppose lbl(u)=lbl(v)=($f$). The function $f$ may be a nullary function producing some constant value y. Then eval(u)=$f$( )=eval(v). By induction, let U'={$u_i \in$Vu|($u_i$, u)∈$E_u$} and V'={$v_i \in V_v$|($v_i$, v)∈$E_v$}. We will assume that eval(u)=eval(v) is true for all members of U' and V', and show that this holds true for u and v with that assumption lbl(u)=lbl(v)=($f, 1_1, 1_2, \ldots, 1_3$).

By decomposing the label, we get $1_i$=lbl($u_i$)=lbl($v_i$) for all i∈[1, n]. We know from the invariant that lbl($u_i$)= lbl($v_i$) ⇒ eval($u_i$)=eval($v_i$). Therefore, $$eval(u) = f(eval(u_1), eval(u_2), \ldots, eval(u_n)) \quad (1)$$
$$= f(eval(v_1), eval(v_2), \ldots, eval(v_n)) \quad (2)$$
$$= eval(v) \quad (3)$$

Subgraphs may now be identified that calculate the same results. However, the label length could grow at O((|V|+ |E|)!) or worse. To solve this, an alternate label function may be defined lbl*:

$$lbl*(v) = \begin{cases} g(task(v)) & task(v) \text{ is nullary} \\ g(task(v), lbl*(v_1), lbl*(v_2), \ldots, lbl*(v_n)) & task(v) \text{ is } n\text{-ary} \end{cases}$$

The function g is a fingerprint function mapping arbitrary length input to a fixed length output. However, this may open up the possibility for collisions, where two different subgraphs have the same label but different outputs. Using, for example, Rabin's algorithm, as provided in Michael O. Rabin, *Fingerprinting by Random Polynomials*. Technical Report TR-15-81, Center for Research in Computing Technology, Harvard University, 1981, for g, the probability for a collision is k/$2^{k-1}$.

Accordingly, this approach provides for a fixed length identifier that can be efficiently indexed to discover whether the output of that task is already in the cache. Additionally, a functional description of the output is provided by the label. As such, if two different workflows have the same subgraphs or tasks for determining the same result, then the workflows may benefit from caching without having information about the other or having to coordinate names for the cached outputs. As stated above, this approach is merely an example approach that can be used for generating a label.

One of skill in the art would appreciate that other hashing algorithms could also be utilized or incorporated in the approach for generating a label as described herein.

Once labels are defined for the tasks in the workflow, the workflow may be submitted to the cache management module 134. The cache management module 134 may operate to determine if a given label is already in the cache 150 and make reservations for workflow task outputs, which may or may not already be in the cache 150. At initialization, the cache management module 134 may be given a fixed maximum storage size that workflow task outputs can use. In this regard, every task in a workflow may have an upper bound size estimate and it may be assumed that a task will not exceed that upper bound. Based on this, the cache management module 134 may make reservations for all tasks in the workflow. If there is not enough space in the cache 150, the cache management module 134 may attempt to evict cached results that do not have reservations and are not otherwise needed. If not enough space in the cache 150 can be evicted, the entire workflow may go in a queue. According to some example embodiments, no partial workflow reservations may be permitted.

In this regard, either the whole workflow may be reserved, or none of the workflow is reserved. In the event that a reservation is released for a workflow that no longer needs some task result in the cache, the process may be repeated on the oldest workflow in the queue. The queue may, according to some example embodiments, therefore operate to guarantee liveness. According to some example embodiments, workflows may be reserved atomically, thereby ensuring that there is not a situation where a deadlock exists with two partially reserved workflows. Further, since, according to some example embodiments, workflows may not be reserved out of order, a bounded bypass of zero may be realized and safety may be guaranteed by the reservation system. In this regard, cache results with reservations may never be removed. Accordingly, a running workflow should not have cached inputs removed while the workflow is running. Again, since there are reservations for the upper bound on each workflow task result, there should be space available for each workflow task.

Figure 2B:
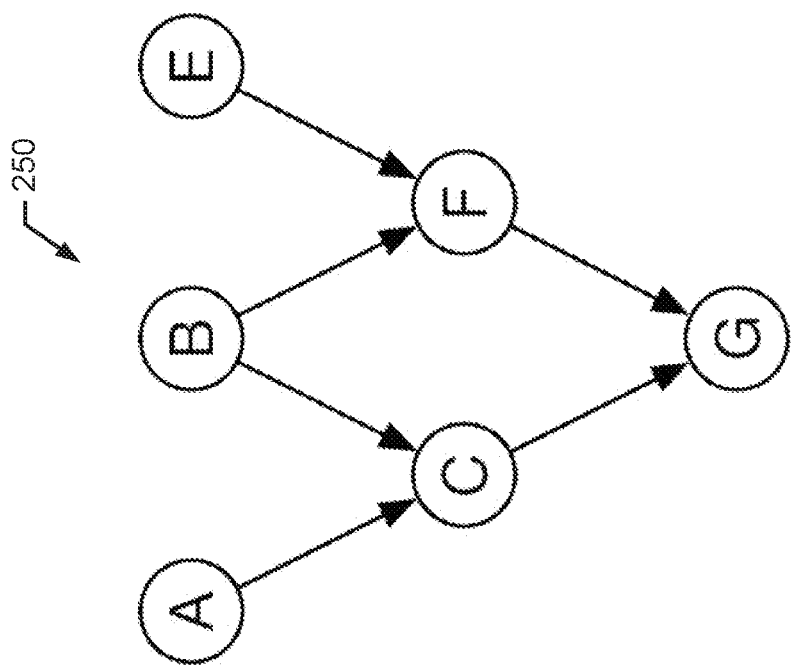
FIGS. 2A and 2B show an example workflows of tasks according to an example embodiment.
Figure 2A:
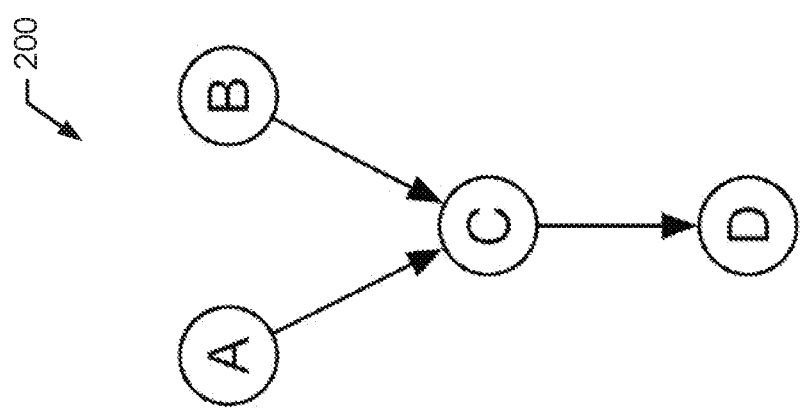

Following from the discussion of some example embodiments as provided above, an example caching process is described with respect to FIGS. 2A and 2B. In this regard, suppose the workflow 200 G=({A,B,C,D}, {(A,C), (B,C), (C,D)}) shown in FIG. 2A is executed and cached. In this regard, the results may be stored in the cache as shown in Table 1.

TABLE 1

| Task | Label |
|------|-------|
| A | $g(f_A)$ |
| B | $g(f_B)$ |
| C | $g(f_C, g(f_A), g(f_B))$ |
| D | $g(f_D, g(f_C, g(f_A), g(f_B)))$ |

Subsequently, a client may need to execute the workflow 250 shown in FIG. 2B, which is G'=({A,B,C,D,E,F,G}, {(A,C), (B,C), (B,F), (E,F), (C,G), (F,G)}). In this regard, the client may submit a reservation request for the workflow labels, as shown in Table 2. The request would be associated with a maximum size bound for each task result, however this is removed from this example for clarity purposes.

TABLE 2

| Task | Label |
|------|-------|
| A | $g(f_A)$ |
| B | $g(f_B)$ |
| C | $g(f_C, g(f_A), g(f_B))$ |
| E | $g(f_E)$ |
| F | $g(f_F, g(f_B), g(f_E))$ |
| G | $g(f_G, g(f_C, (f_A), (f_B)), g(f_F, (f_B), (f_E)))$ |

According to some example embodiments, the cache may provide an acknowledgement along with the list of labels and a status for each label in the cache, as shown in Table 3.

TABLE 3

| Task | Label | Presence |
|------|-------|----------|
| A | $g(f_A)$ | PRESENT |
| B | $g(f_B)$ | PRESENT |
| C | $g(f_C, g(f_A), g(f_B))$ | PRESENT |
| E | $g(f_E)$ | ABSENT |
| F | $g(f_F, g(f_B), g(f_E))$ | ABSENT |
| G | $g(f_G, g(f_C, g(f_A), g(f_B)), g(f_F, g(f_B), g(f_E)))$ | ABSENT |

Note that since B and C are already in the cache, it can be determined that B and C need not be re-executed, and the task result can be simply be retrieved from the cache. Furthermore, since A is not required by any tasks not already in the cache, any reservation for task A may be released.

Accordingly, amongst others, there are two primary advantages afforded by some example embodiments of the computational workflow management systems described herein. First, a mechanism is offered for uniquely naming workflow tasks based on how the tasks were generated, so that common outputs can be shared automatically, without the need for workflow or task specific naming. Second, the approach to workflow caching, according to some example embodiments, may eliminate unnecessary processing while preserving safety and liveness.

Accordingly, implementation of the techniques described herein, according to some example embodiments, may improve runtimes and provide for computational efficiencies in a number of settings. In this regard, according to some example embodiments, a solution may make use of duplication between processes within a physics-based simulation to greatly speed up runtime. The caching approach described herein, according to some example embodiments, may save intermediate results that are produced as part of a computational workflow to a cache.

Figure 3:
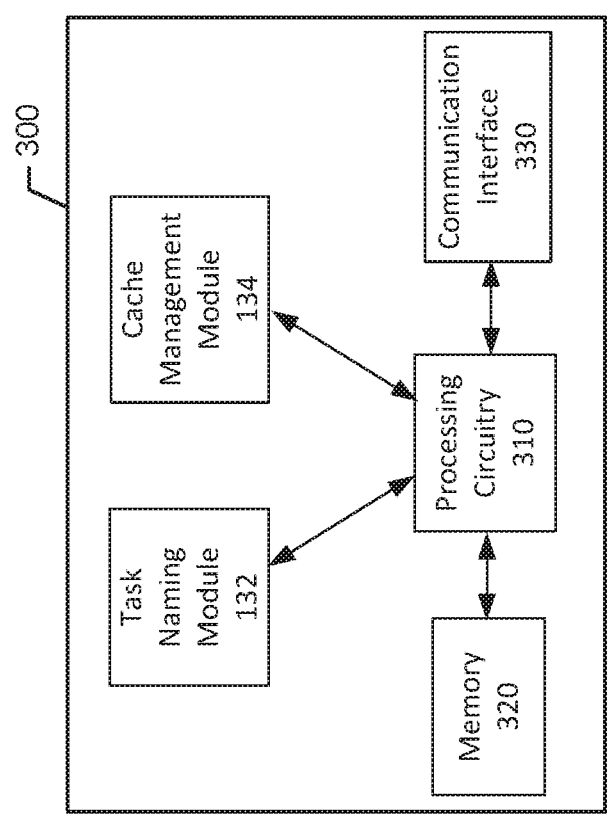
FIG. 3 shows an example apparatus for performing computational workflow management according to an example embodiment.

FIG. 3 provides an example of an apparatus 300 configured to perform computational workflow management according to some example embodiments. The apparatus 300 may be configured to perform some or all of the functionalities described with respect to the entities of FIG. 1. In this regard, the processing circuitry 310 may be configured to implement the task naming module 132 and the cache management module 134, in addition to other functionalities.

Accordingly, FIG. 3 shows block diagrams of some internal components of an apparatus 300 that may comprise processing circuitry 310 that may be in operative communication with the task naming module 132, the cache management module 134, a memory 320, and a communication interface 330. In particular, the task naming module 132 and the cache management module 134 may include or otherwise be in communication with processing circuitry 310 that is configurable to perform actions in accordance with example embodiments described herein including the actions described with respect to workflow management system 130 of FIG. 1.

The processing circuitry 310 may be configured to perform computational processing, cache management or other processing and management services according to an example embodiment. In some embodiments, the processing circuitry 310 may be embodied as a chip or chip set. In other words, the processing circuitry 310 may comprise one or more physical packages (e.g., chips) including materials, components or wires on a structural assembly (e.g., a baseboard). The processing circuitry 310 may be configured to receive inputs (e.g., via peripheral components including the memory 320, perform actions based on the inputs, and generate outputs (e.g., for provision to peripheral components).

In an example embodiment, the processing circuitry 310 may include one or more instances of a processor, associated circuitry, and memory 320. The processing circuitry 310 may be in communication with or otherwise control a user interface (not depicted) and communication interface 330. As such, the processing circuitry 310 may be embodied as a circuit chip (e.g., an integrated circuit chip) configured (e.g., with hardware, software or a combination of hardware and software) to perform operations described herein.

The communication interface 330 may include one or more interface mechanisms for enabling communication with other devices external to apparatus 300, via, for example, a network such as the Internet. In some cases, the communication interface 330 may be any means such as a device or circuitry embodied in either hardware, or a combination of hardware and software that is configured to receive or transmit data from/to devices in communication with the processing circuitry 310.

In an exemplary embodiment, the memory 320 may include one or more non-transitory memory devices such as, for example, volatile or non-volatile memory that may be either fixed or removable. According to some example embodiments, the memory 320 may include or embody cache, such as cache 150 of FIG. 1. The memory 320 may be configured to store information, data, applications, instructions or the like for enabling the task naming module 132 and the cache management module 134 to carry out various functions in accordance with exemplary embodiments of the present invention. For example, the memory 320 could be configured to buffer input data for processing by the processing circuitry 310. Additionally or alternatively, the memory 320 could be configured to store instructions for execution by the processing circuitry 310. Among the contents of the memory 320, applications may be stored for execution by the processing circuitry 310 in order to carry out the functionality associated with each respective application. In some cases, the applications may include directions associated with task naming module 132 and the cache management module 134.

The processing circuitry 310 may be embodied in a number of different ways. For example, the processing circuitry 310 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processing circuitry 310 may be configured to execute instructions stored in the memory 320 or otherwise accessible to the processing circuitry 310. As such, whether configured by hardware or by a combination of hardware and software, the processing circuitry 310 may represent an entity (e.g., physically embodied in circuitry—in the form of processing circuitry 310) capable of performing operations according to embodiments of the present invention while configured accordingly. Thus, for example, when the processing circuitry 310 is embodied as an ASIC, FPGA or the like, the processing circuitry 310 may be specifically configured hardware for conducting the operations described herein. Alternatively, as another example, when the processing circuitry 310 is embodied as an executor of software instructions, the instructions may specifically configure the processing circuitry 310 to perform the operations described herein.

In an example embodiment, the processing circuitry 310 may be embodied as, include or otherwise control the task naming module 132 and the cache management module 134. As such, in some embodiments, the processing circuitry 310 may be said to cause each of the operations described in connection with the task naming module 132 and the cache management module 134 to undertake the corresponding functionalities responsive to execution of instructions or algorithms configuring the processing circuitry 310 accordingly. For example, the processing circuitry 310 may provide programmable control signals, selections, and the like to control the operation of the apparatus 300 in accordance with the task naming module 132 and the cache management module 134 responsive to execution of instructions stored in the memory 320.

The task naming module 132 may be embodied in hardware of the processing circuitry 310 or embodied in the hardware of the processing circuitry as configured by instructions stored in the memory 320. In this regard, the task naming module 132 may be configured to receive a computation resource reservation request for cache from a client to perform a computation. The task naming module 132 may receive a representation of the computation and decompose the computation into a workflow of tasks. Each task within the workflow may have a task result that is determined upon execution and completion of the task. At least some tasks in the workflow may be dependent upon the task results of other tasks. The task naming module 132 may be further configured to generate a task label for each task and associated task result. In this regard, each task label may be a functional description of the associated task result and the task results that are dependent to the associated task result. As tasks are executed and completed, the task result may be stored in cache reserved for that task. The task result may therefore be stored in association with the task label. According to some example embodiments, the task naming module 132 may be configured to receive a maximum memory size bound for each task in the workflow. Further, in accordance with some example embodiments, the generated labels have a fixed, standard length.

The cache management module 134 may be configured to compare a selected task label with previous task labels that are stored in association with portions of cache to determine if the selected task label matches one of the previous task labels. The selected task label may be one of the generated task labels associated with the received computation and the computation resource reservation request. Accordingly, the previous task labels may be associated with task results for previously executed tasks that are currently stored in a cache. The cache management module 134 may be further configured to, in response to determining that the selected task label matches one of the previous task labels, perform the computation using a task result that is associated with the matched one of the previous task labels that is currently stored in the cache for the task result of the selected task label. In other words, rather than executing the task, the cache management module 134 may be configured to use the task result that is already stored in the cache thereby reducing the use of processing resources.

According to some example embodiments, the cache management module 134 may be configured to release a portion of the cache reserved for a task that is dependent to the selected task when the selected task is complete because the task result of the dependent task is only needed to determine the task result for the selected task. Further, the cache management module 134 may be configured to compare the generated task labels with the previous task labels to identify previous task labels that do not match with a generated task label and are not reserved by other workflows, and evict portions of the cache associated with the previous task labels that do not match a generated task label and are not reserved by other workflows. According to some example embodiments, the cache management module 134 may be configured to calculate the cache size requirements for the workflow based on the maximum memory size bound for each task in the workflow.

Further, according to some example embodiments, the cache management module 134 may be configured to receive a maximum memory size bound for each task in the workflow, compare the generated task labels with the previous task labels to identify previous task labels that do not match a generated task label and are not reserved by other workflows, evict portions of the cache associated with the previous task labels that do not match a generated task label and are not reserved by other workflows, and calculate the cache size requirements for the workflow based on the maximum memory size bound for each task in the workflow and the freed portions of the cache. The cache management module 134 may also be configured to request and receive, from the cache, a listing of the previous task labels for the comparison.

Figure 4:
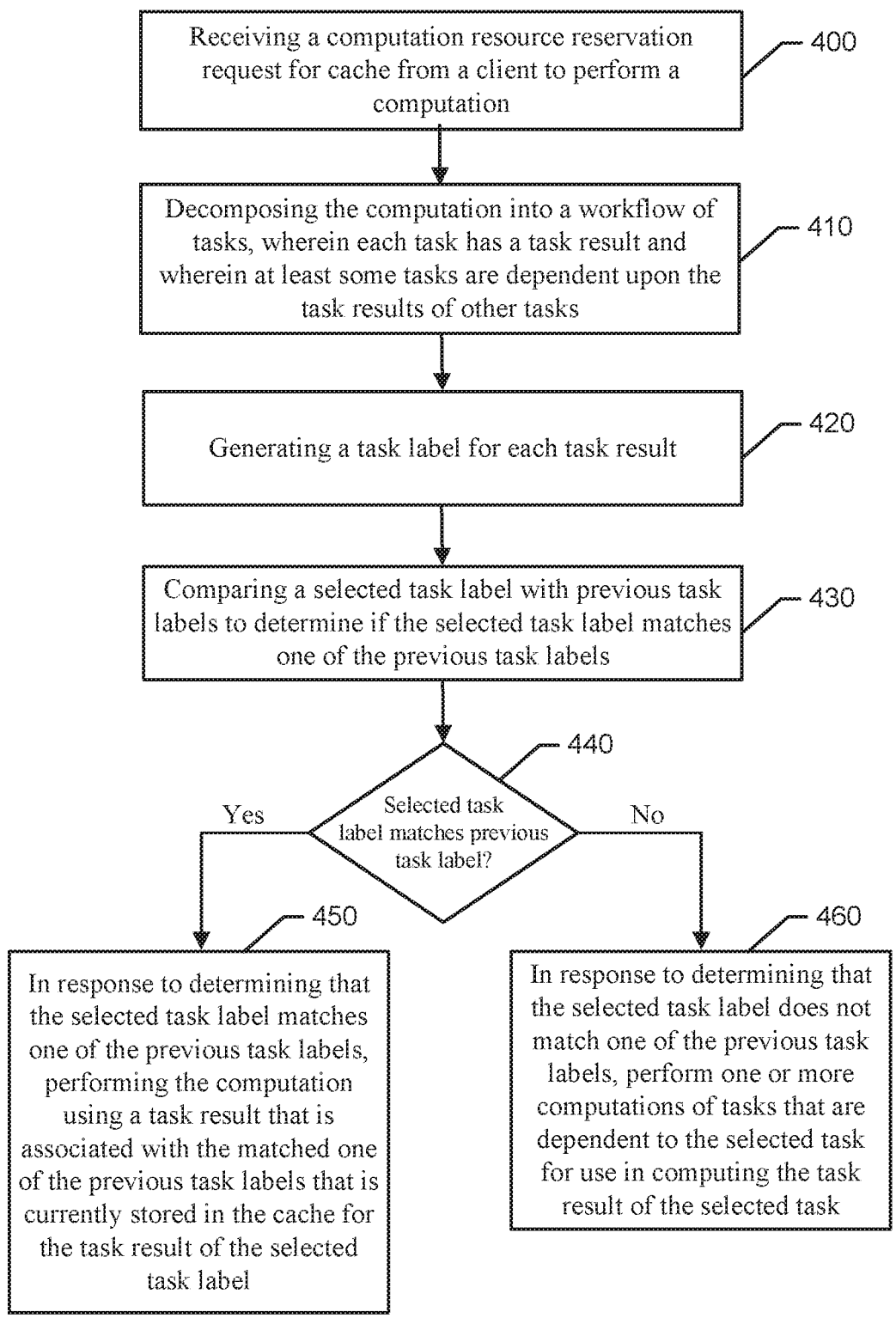
FIG. 4 shows flow chart of a method for performing computational workflow management according to an example embodiment.

Referring now to FIG. 4, a block diagram of an example method for performing workflow management, as implemented by the system 100, the workflow management system 130, or the apparatus 300, is provided. In this regard, the example method may include, at 400, receiving a computation resource reservation request for cache from a client to perform a computation, and, at 410, decomposing, for example by processing circuitry, the computation into a workflow of tasks. Each task may have a task result and at least some tasks may be dependent upon the task results of other tasks. At 420, the example method may include generating a task label for each task and associated task result. Each task label may be a functional description of the associated task and the tasks that are dependent to the associated task. At 430, the example method may include comparing a selected task label with previous task labels to determine if the selected task label matches one of the previous task labels. The selected label may be one of the generated labels, and the previous task labels may be associated with task results for previously executed tasks that are currently stored in a cache. Based upon the result of the comparison, a determination of whether the selected task label matches the previous task label may be performed at 440. The example method may also include, at 450, in response to determining that the selected task label matches one of the previous task labels, performing the computation using a task result that is associated with the matched one of the previous task labels that is currently stored in the cache for the task result of the selected task label. Alternatively, at 460, in response to determining that the selected task label does not match one of the previous task labels, the example method may include performing one or more computations of tasks that are dependent to the selected task for use in computing the task result of the selected task.

According to some example embodiments, the example method may include releasing a portion of the cache reserved for a task that is dependent to the selected task when the selected task is complete because the task result of the dependent task is only needed to determine the task result for the selected task. Further, according to some example embodiments, the example method may include comparing the generated task labels with the previous task labels to identify previous task labels that do not match with a generated task label, and releasing portions of the cache associated with the previous task labels that do not match a generated task label. The example method may include, according to some example embodiments, receiving a maximum memory size bound for each task in the workflow. In some example embodiments, the example method may include calculating the cache size requirements for the workflow based on the maximum memory size bound for each task in the workflow.

Additionally, in some example embodiments, the example method may include receiving a maximum memory size bound for each task in the workflow, comparing the generated task labels with the previous labels to identify previous task labels that do not match with a generated task label and are not reserved by other workflows, evicting portions of the cache associated with the previous task labels that do not match a generated task label and are not reserved by other workflows, and calculating the cache size requirements for the workflow based on the maximum memory size bound for each task in the workflow and the freed portions of the cache. In some example embodiments, the generated labels may a fixed length. Further, the example method may include, according to some example embodiments, comprising requesting and receiving, from the cache, a listing of the previous task labels for the comparison.

As used herein, the term "module" is intended to include a computer-related entity, such as but not limited to hardware, software, or a combination of hardware and software. For example, a module may be, but is not limited to being a software or hardware implementation of a process, an object, an executable, and/or a thread of execution, which may be implemented via a processor or computer. By way of example, both an application running on a computing device and/or the computing device can be a module. One or more modules can reside within a process and/or thread of execution and a module may be localized on one computer and/or distributed between two or more computers. In addition, these modules can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although such example is described in terms of separate modules corresponding to various functions performed, some examples need not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular entity that is specifically configured in, or can be operably coupled to, processing circuitry to modify the behavior and/or capability of the processing circuitry based on the hardware and/or software that is added to or otherwise operably coupled to the processing circuitry to configure the processing circuitry accordingly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An apparatus configured to perform computational workflow management, the apparatus comprising processing circuitry and a cache, the processing circuitry configured to:
   receive a computation resource reservation request for the cache from a client;
   decompose the computation resource reservation request into a workflow of tasks, wherein each task has a task result and wherein at least some tasks are dependent upon the task results of other tasks;
   generate a task label for each task result and its associated task, wherein each task label is a functional description of the associated task and tasks that are dependent upon the task result of the associated task;
   compare a selected task label with previous task labels to determine if the selected task label matches one of the previous task labels, wherein the selected task label is one of the generated task labels, and wherein the previous task labels are associated with task results for previously executed tasks that are currently stored in the cache;
   in response to determining that the selected task label matches one of the previous task labels, retrieve the task result associated with the matched one of the previous task labels from the cache; and
   in response to determining that the selected task label does not match any of the previous task labels, evict portions of the cache associated with the previous task labels that do not match the selected task label and are not reserved by other workflows, perform the task associated with the selected task label, and store the task result of the performance to the evicted portions of the cache.

2. The apparatus of claim 1, wherein the processing circuitry is further configured to:
   release a portion of the cache reserved for a task that is dependent upon the selected task when the selected task is complete.

3. The apparatus of claim 1, wherein the processing circuitry is further configured to:
   receive a maximum memory size bound for each task in the workflow.

4. The apparatus of claim 3, wherein the processing circuitry is further configured to:
   calculate cache size requirements for the workflow based on the maximum memory size bound for each task in the workflow.

5. The apparatus of claim 1, wherein the processing circuitry is further configured to:
   receive a maximum memory size bound for each task in the workflow;
   compare the generated task labels with the previous task labels to identify previous task labels that do not match the generated task labels and are not reserved by the other workflows;
   evict portions of the cache associated with the previous task labels that do not match the generated task labels and are not reserved by the other workflows; and
   calculate cache size requirements for the workflow based on the maximum memory size bound for each task in the workflow and the evicted portions of the cache.

6. The apparatus of claim 1, wherein the generated labels have a fixed length.

7. The apparatus of claim 1, wherein the processing circuitry is further configured to:
   request and receive, from the cache, a listing of the previous task labels for the comparison.

8. An apparatus configured to perform computational workflow management, the apparatus comprising processing circuitry and a cache, the processing circuitry configured to:
   receive a computation resource reservation request for the cache from a client;
   decompose the computation resource reservation request into a workflow of tasks, wherein each task has a task result and wherein at least some tasks are dependent upon the task results of other tasks;
   generate a task label for each task result and its associated task, wherein each task label is a functional description of the associated task and tasks that are dependent upon the task result of the associated task;
   compare the generated task labels with previous task labels to identify previous task labels that do not match the generated task labels, wherein the previous task labels are associated with task results for previously executed tasks that are currently stored in a cache;
   evict portions of the cache associated with the previous task labels that do not match the generated task labels and are not reserved by other workflows;
   perform the tasks associated with the generated task labels that do not match the identified previous task labels; and store the task results of the performance to the evicted portions of the cache.

9. The apparatus of claim 8, wherein the processing circuitry is further configured to:
receive a maximum memory size bound for each task in the workflow.

10. The apparatus of claim 9, wherein the processing circuitry is further configured to:
calculate cache size requirements for the workflow based on the maximum memory size bound for each task in the workflow.

11. The apparatus of claim 9, wherein the processing circuitry is further configured to:
calculate cache size requirements for the workflow based on the maximum memory size bound for each task in the workflow and the evicted portions of the cache.

12. A method for performing computational workflow management, the method comprising:
receiving a computation resource reservation request for a cache from a client;
decomposing the computation resource reservation request into a workflow of tasks, wherein each task has a task result and wherein at least some tasks are dependent upon the task results of other tasks;
generating a task label for each task result and its associated task, wherein each task label is a functional description of the associated task and tasks that are dependent upon the task result of the associated task;
comparing a selected task label with previous task labels to determine if the selected task label matches one of the previous task labels, wherein the selected label is one of the generated labels, and wherein the previous task labels are associated with task results for previously executed tasks that are currently stored in the cache; and
in response to determining that the selected task label matches one of the previous task labels, retrieving the task result associated with the matched one of the previous task labels from the cache; and in response to determining that the selected task label does not match any of the previous task labels, evicting portions of the cache associated with the previous task labels that do not match the selected task label and are not reserved by other workflows, performing the task associated with the selected task label, and storing the task result of the performance to the evicted portions of the cache.

13. The method of claim 12, further comprising:
releasing a portion of the cache reserved for a task that is dependent upon the selected task when the selected task is complete.

14. The method of claim 12, further comprising:
receiving a maximum memory size bound for each task in the workflow.

15. The method of claim 14, further comprising:
calculating cache size requirements for the workflow based on the maximum memory size bound for each task in the workflow.

16. The method of claim 12, further comprising:
receiving a maximum memory size bound for each task in the workflow;
comparing the generated task labels with the previous labels to identify previous task labels that do not match the generated task labels and are not reserved by the other workflows;
evicting portions of the cache associated with the previous task labels that do not match the generated task labels and are not reserved by the other workflows; and
calculating cache size requirements for the workflow based on the maximum memory size bound for each task in the workflow and the evicted portions of the cache.

17. The method of claim 12, wherein the generated labels have a fixed length.

18. The method of claim 12, further comprising:
requesting and receiving, from the cache, a listing of the previous task labels for the comparison.

* * * * *